United States Patent
Visoz et al.

(10) Patent No.: US 7,760,828 B2
(45) Date of Patent: Jul. 20, 2010

(54) ITERATIVE DECODING AND EQUALIZING METHOD FOR HIGH SPEED COMMUNICATIONS ON MULTIPLE ANTENNA CHANNELS DURING TRANSMISSION AND RECEPTION

(75) Inventors: Raphaël Visoz, Issy les Moulineaux (FR); Sami Chtourou, Paris (FR); Antoine Berthet, Chatenay Malabry (FR)

(73) Assignee: France Telecom, Paris (FR)

( * ) Notice: Subject to any disclaimer, the term of this patent is extended or adjusted under 35 U.S.C. 154(b) by 1078 days.

(21) Appl. No.: 10/570,053

(22) PCT Filed: Aug. 6, 2004

(86) PCT No.: PCT/FR2004/002104
§ 371 (c)(1),
(2), (4) Date: Feb. 28, 2006

(87) PCT Pub. No.: WO2005/025118
PCT Pub. Date: Mar. 17, 2005

(65) Prior Publication Data
US 2006/0251164 A1    Nov. 9, 2006

(30) Foreign Application Priority Data
Aug. 29, 2003   (FR) .................................. 03 10290

(51) Int. Cl.
*H04B 1/10* (2006.01)
(52) U.S. Cl. .................. 375/350; 375/148; 375/232; 375/233; 375/259; 375/260; 375/267; 375/341
(58) Field of Classification Search ......... 375/346–350, 375/233, 148, 232, 249, 250, 267, 341
See application file for complete search history.

(56) References Cited

U.S. PATENT DOCUMENTS
5,561,687 A * 10/1996 Turner .................... 375/233
(Continued)

FOREIGN PATENT DOCUMENTS
EP        1069722 A      1/2001

OTHER PUBLICATIONS

Tonello, A.,"Space-Time Bit-Interleaved Coded Modulation over Frequency Selective Fading Channels with Iterative Decoding", Dec. 2000, Global Tlecommunication Conference, 2000. vol. 3, p. 1615-1619.*

(Continued)

*Primary Examiner*—Mohammad H Ghayour
*Assistant Examiner*—Sung Ahn
(74) *Attorney, Agent, or Firm*—Cohen Pontani Lieberman & Pavane LLP

(57) ABSTRACT

An iterative decoding and equalizing device for high bit rate communication over frequency-selective channels with multiple transmit and receive antennas, said device including a decision feedback equalizer adapted to receive data from different receive antennas and including a forward filter (9) and a recursive backward filter (12) fed with calculated weighted reconstituted data from the output of a decoder (13) fed by decision means (11) and means for subtracting the output of said backward filter (12) from the output data of the forward filter (9) whereby the subtracted data is fed to the input of the decision means (11) with the output of the decoder (13) and the decision means (11) produce a statistic which is forwarded to a channel decoder with weighted inputs and outputs and said decision means (11) take into account the space noise correlation at the output of the subtraction means (10) and the decision means (11) and the decoder (13) are separated by space-time interleaving at bit level, which device is characterized in that the forward filter (9) and the backward filter (12) are iteratively adapted to minimize the mean square error at the output of the subtractor (10).

9 Claims, 2 Drawing Sheets

U.S. PATENT DOCUMENTS

2003/0185310 A1* 10/2003 Ketchum et al. ............ 375/259
2004/0196935 A1* 10/2004 Nieto ......................... 375/350
2007/0253496 A1* 11/2007 Giannakis et al. ........... 375/260

OTHER PUBLICATIONS

Tidestav, C., "Realizable MIMO Decision Feedback Equalizers: Structure and Design", Jan. 2001, Signal Processing, vol. 49, p. 121-133.*

Yu Xiaoyong, "Iterative Turbo Decoder with Decision Feedback Equalizer for Signals Transmitted over Multipath channels", IEEE VTS 53$^{rd}$ Vehicular Technology Conference, Rhodes, Greece, May 6-9, 2001; IEEE Vehicular Technology Conference, New York, NY: IEEE, U.S., vol. 3 of 4 Conf. 53, May 6, 2001, pp. 1634-1638.

M. Honig et al., "Adaptive Decision Feedback Turbo Equalization", Proceedings from IEEE Int'l. Symposium on Information Theory. ISIT 02. Lausanne, Switzerland, Jun. 30-Jul. 5, 2002; IEEE Int'l. Symposium on Information Theory, New York, NY, IEEE, US, Jun. 30, 2002, p. 413.

M. Noorbakhsh et al., "Combined turbo equalization and block turbo coded modulation", IEE Proceedings: Communications, Institution of Electrical Engineers, GB, vol. 150, No. 3, May 13, 2003, pp. 149-152.

* cited by examiner

ITERATIVE DECODING AND EQUALIZING METHOD FOR HIGH SPEED COMMUNICATIONS ON MULTIPLE ANTENNA CHANNELS DURING TRANSMISSION AND RECEPTION

PRIORITY CLAIM

This is a U.S. national stage of application No. PCT/FR2004/002104, filed on Aug. 6, 2004. Priority is claimed on the following application: France Application No. 03/10290 filed on Aug. 29, 2003, the content of which is incorporated here by reference.

The present invention relates to the field of digital communication.

It relates more particularly to an iterative decoding and equalizing method and device for high-speed communication over multiple transmit antenna channels and more particularly over frequency-selective channels with multiple transmit and receive antennas.

GENERAL TECHNICAL FIELD

With the development of antenna technologies, communications models based on TDMA, CDMA, POFDM and combinations thereof are being systematically revised and expanded to encompass MIMO channels. Two major space-time coding classes are envisaged, which have different philosophies:

BLAST transmission developed by Bell Labs aims to use space multiplexing to increase the bit rate that can be transmitted over the channel. There are two ways to combine BLAST with error corrector channel coding, yielding two different layered space-time coding models. In the first (ST BICM) model, a single coding operation linking the various layers is applied to the data before space-time interleaving and space demultiplexing [1, LST-I, p. 1350]. In the second (MAC) model, the data is space demultiplexed and then coded and interleaved independently on each layer [1, LST-II, p. 1350].

Diversity schemes use space diversity to combat the effects of channel fading more effectively and to improve performance. There are STTC schemes, which improve coding, and STBC schemes (and their generalizations OD, LDC, etc.), which do not lead to coding gain 5 and are often combined with the best trellis coded modulations known in the art for the Gaussian channel.

Recent theoretical contributions have proved that improvements in space multiplexing and space diversity are linked by a relationship of compromise. For example, the two above-mentioned approaches cannot increase capacity in the same proportions for arbitrarily high numbers M, N of transmit antennas and receive antennas. It can be shown that transmit diversity schemes are optimized from the information theory point of view only in the MISO configuration $\{M, N\}=\{2, 1\}$, which seriously calls into question their relevance to high bit rate communication over MIMO channels using a large number of antennas.

Only the ST-BICM approach guarantees linear augmentation of capacity with min $\{M, N\}$.

This is why it is necessary to opt for this type of transmission and to concentrate design effort on a suitable receiver guaranteeing performance as close as possible to the fundamental limits. Unlike STBC, ST-BICM does not ensure mutual orthogonality of the data streams transmitted by the various antennas.

In the case of transmission over a frequency-selective MIMO channel, this coding strategy therefore calls for conjoint detection of data at the receiver to eliminate multiple access interference (MAI) in the space domain and intersymbol interference (ISI) in the time domain.

The conjoint data detection function constitutes the delicate and complex element of the receiver, especially as ST-BICM inherently necessitates iterative processing between channel detection and decoding to capture all of the diversity in the space domain.

GENERAL DESCRIPTION OF THE PRIOR ART

Iterative Decoding on Non-Frequency-Selective MIMO Channels

Iterative decoding of ST-BICM on MIMO channels that are not frequency selective constitute a special case of the problem to be solved under the two-fold assumption of perfect ISI cancellation and recovery of all the energy available for each symbol.

The problem may then be restated in the following terms: "cancellation of MAI on a flat MIMO channel in the presence of spatially colored noise". It necessitates calculation at all times of the APP for the bits of the symbols of the vectors transmitted (statistics on the data to be forwarded to the decoder).

Two methods are described in the literature:
  Exact calculation of the APP based on an exhaustive list (MAP). The complexity of this method is prohibitive, since it increases exponentially with the number of transmit antennas M and is a polynomial function of the order Q of the constellations employed.
  Approximate calculation of the APP from a reduced list of candidate vectors generated by a sphere decoding algorithm [2]. The sphere decoding algorithm has at least two advantages: it preserves the MAP criterion and has a complexity in O (M3) that is insensitive to the order Q of the constellations employed. Note that the sphere decoding algorithm may be regarded as a variant of the Fano sequential decoding algorithm.
  Approximate calculation of the APP from a short list of candidate vectors generated by a sequential stack algorithm.

The sphere decoding algorithm has been intensively studied for MIMO channels that are not frequency-selective. Generalizing to the situation of frequency-selective MIMO channels is non-trivial.

A brutal approach would be block replication. This approach is of little interest as it artificially increases the size of the search space (and therefore increases complexity) and introduces redundant decoding of symbols.

The algorithm described in [2] is derived for MIMO channels that are not frequency selective. The jury is still out on generalizing it to the situation of frequency-selective MIMO channels.

The performance of these two algorithms is essentially determined by the quality of the list of candidates generated, which is preferably of fixed size. It is crucial for it to include the best candidate decoding a 1 bit and the best candidate decoding a 0 bit in any position.

Iterative Decoding on Frequency-Selective MIMO Channels
  Several types of detectors inserted into iterative structures have been proposed.
  Detectors with weighted inputs and outputs applying the MAP criterion based on the BCJR algorithm. The complexity of this receiver in O (QLxM) is clearly prohibitive for high order modulation and MIMO channels with a large number of inputs and high memory demand.

Sub-optimal weighted input and output detectors based on efficient search algorithms in trellises greatly reduced in terms of number of states [3] and preceded, where appropriate, by minimum phase filters. This approach is still limited by its complexity in O (QLrxM), where Lr represents the reduced constraint length. In particular, the use of constellations with a large number of states is excluded.

Transposing non-linear detectors constructed from iterative linear cancellation by interference (see [4] in a multi-user detection context) to the MIMO context is generally based on the analogy between different users and antennas. Their implementation therefore requires one filter per antenna and their performance is limited by the non-contiguous MMSE per antenna approach, which has the advantage that its complexity is a polynomial function of the number of send antennas.

SUMMARY OF THE INVENTION

An object of the invention is to propose an advanced receiver for high bit rate digital transmission over frequency-selective channels with multiple transmit and receive antennas that is not very complex—and in particular does not necessitate large computation powers—whilst providing for processing interference between antennas in the space domain and interference between symbols in the time domain.

To this end, the invention proposes an iterative decoding and equalizing device for high bit rate communication over frequency-selective channels with multiple transmit and receive antennas, said device comprising a decision feedback equalizer adapted to receive data from different receive antennas and including a forward filter and a recursive backward filter fed with calculated weighted reconstituted data from the output of a decoder fed by decision means and the device further including means for subtracting the output of said backward filter from the output data of the forward filter, whereby the subtracted data is fed to the input of the decision means with the output of the decoder and the decision means produce a statistic which is forwarded to a channel decoder with weighted inputs and outputs and said decision means take into account the space noise correlation at the output of the subtraction means and the decision means and the decoder are separated by space-time interleaving at a binary level, which device is characterized in that the forward filter and the backward filter are iteratively adapted to minimize the mean square error at the output of the subtractor.

A device of the above kind advantageously has the following complementary features, individually or in all technically possible combinations:

the decision means at the output of the subtraction means of the equalizer are of the space whitening type and followed by a sphere decoder;

the decision means at the output of the subtraction means of the equalizer are of the serial and/or parallel type (SIC/PIC) adapted to cancel residual space interference at the output of the subtraction means of the equalizer;

the space whitening is effected at the output of the subtraction means of the equalizer;

the space whitening is effected by the decision means;

the space whitening is effected by the forward filter and the backward filter;

starting from a certain iteration, the forward filter is an adapted filter, the backward filter the same adapted filter minus the central coefficient.

The invention stems from a novel approach that is radically different from those that consider the antennas as different users. The signal transmitted is seen as a T-dimensional modulation, where T is the number of transmit antennas. This changed point of view has considerable impact on the design of the receiver, which consists of a linear iterative equalizer considering at its input T-dimensional vector modulation convoluted with a frequency-selective channel, followed by a T-dimensional modulation detector (for example a sphere decoder) capable of generating flexible information for the channel decoder. This approach has two advantages over the prior art in that it is less complex, as it necessitates a single (vectorial) filter, and offers better performance because it allows a choice of the vector detection criterion.

The invention also relates to a system for high bit rate communication over frequency-selective channels with multiple transmit and receive antennas characterized in that it includes a receiver that includes an equalization and decoding device according of the above type.

The transmit means are of the ST-BICM type, for example, which is advantageous.

The invention further proposes an iterative decoding and equalizing method for high bit rate communication over frequency-selective channels with multiple transmit and receive antennas, using a decision feedback equalizer adapted to receive data from different receiving antennas and including a forward filter and a recursive backward filter fed with calculated weighted reconstituted data from the output of a decoder fed by decision means and using means for subtracting the output of said backward filter from the output data of the forward filter whereby the subtracted data is fed to the input of the decision means with the output of the decoder and the decision means produce a statistic which is forwarded to a channel decoder with weighted inputs and outputs, and said decision means take into account the space noise correlation at the output of the subtraction means and the decision means and the decoder are separated by space-time interleaving at a binary level, which method is characterized in that the forward filter and the backward filter are iteratively adapted to minimize the mean square error at the output of the subtractor.

DESCRIPTION OF THE DRAWINGS

Other features and advantages of the invention emerge from the following description, which is purely illustrative and is not limiting on the invention, and should be read in conjunction with the appended drawings, in which.

DESCRIPTION OF ONE OR MORE EMBODIMENTS OF THE INVENTION

BLAST Technique and ST-BICM Coding

Figure 1:
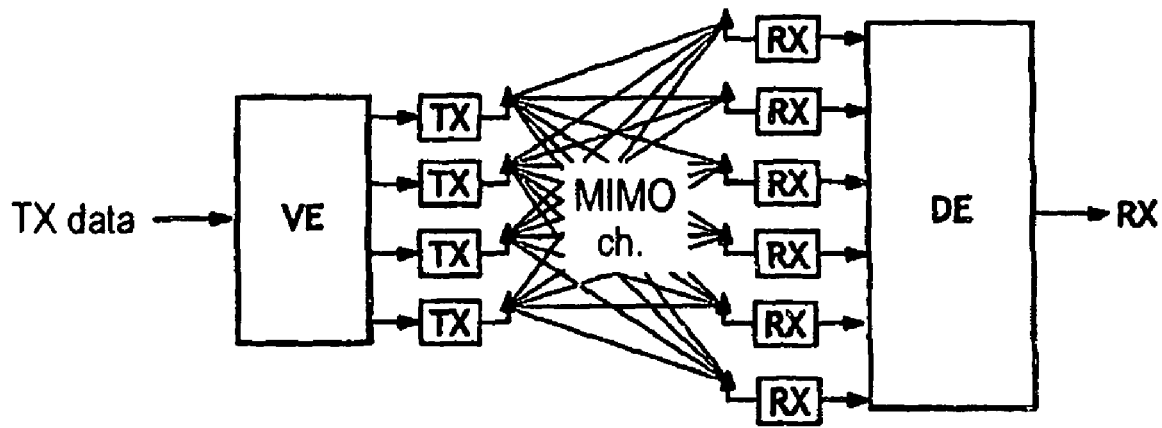
FIG. 1 shows the VBLAST concept.

FIG. 1 is a general diagram of a BLAST architecture.

After space-time interleaving and space demultiplexing, data coded in a single vectorial encoding device EV is transmitted by a plurality of transmit antennas TX; at the other end of the MIMO channels, the transmitted signals are received by a plurality of receiver antennas RX that forward them to decoding means DE (MIMO channels) at the output whereof the data is recovered.

The following description relates to frequency-selective MIMO channels. The presence of inter-symbol interference increases the complexity of the receiver.

Figure 2:
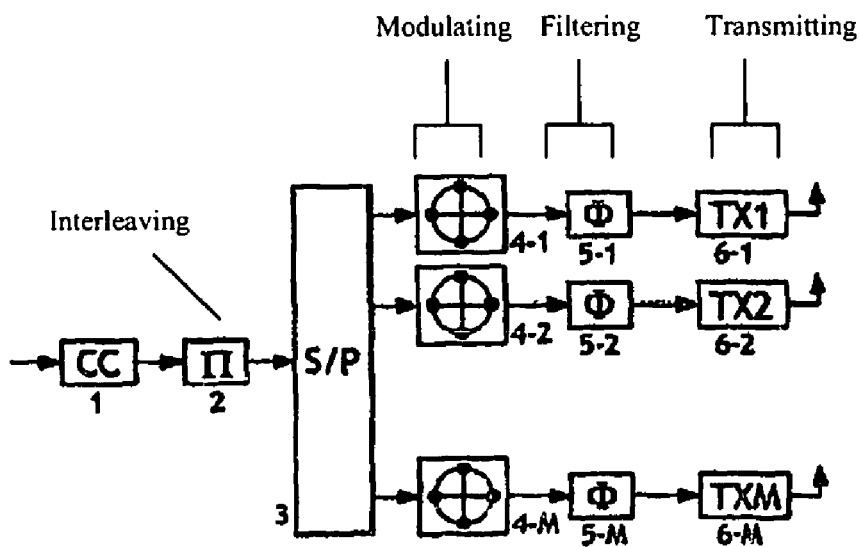
FIG. 2 shows a general model of ST-BICM communication.

FIG. 2 shows the ST-BICM general communications model.

On transmission, the data is corrector channel coded (1) (convolutional code, turbocode, LDPC code, etc.), interleaved (2) at the binary level, space demultiplexed (3) and, for each layer, modulated (4-1 to 4-M). After shaping filtering (5-1 to 5-M), the modulated data is forwarded to transmit antennas 6-1 to 6-M.

Description of Transmit and Receive Processing

On transmission, the data is subjected to ST-BICM processing.

This involves the following steps:
receiving a digital data stream at a given bit rate;
applying channel corrector coding 1 to generate a coded digital data stream;
interleaving (2) the coded digital data by means of a bit level interleaver;
space demultiplexing (3) the interleaved coded digital data stream to create a plurality of separate coded digital data streams called transmitter layers (M distinct streams or transmitter layers).

Then, for each of the M distinct coded digital data streams:
modulating (4-1 to 4-M) the interleaved coded digital data stream 15 in accordance with a modulation scheme to obtain a stream of modulated symbols;
filtering (5-1 to 5-M) the modulated stream;
transmitting (6-1 to 6-M) the modulated stream via its own transmitter antenna.

Figure 3:
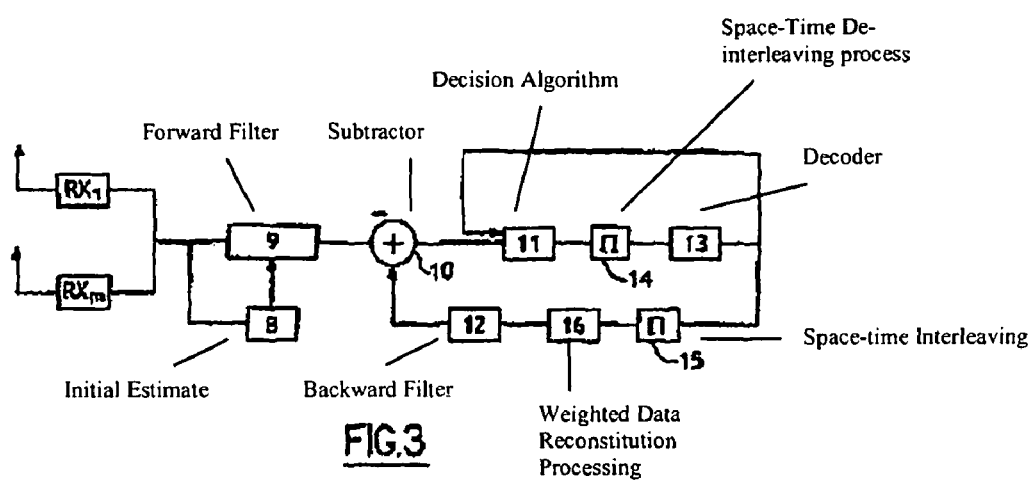
FIG. 3 shows the architecture of an iterative receiver conforming to one embodiment of the invention.

FIG. 3 shows the receiver of the transmission system.

It includes a decision feedback equalizer defined by a forward filter 9, a subtractor 10, a decision algorithm 11 and a recursive backward filter 12.

The recursive backward filter 12 is fed with weighted reconstituted calculated data from the output of a decoder 13 fed by the decision algorithm 11.

The forward filter 9 and the backward filter 12 are determined iteratively to minimize the mean square error (MSE) of the MIMO equalizer, i.e. to minimize the error at the output of the subtractor 10.

To this end they use an initial estimate 8 of the MIMO channel.

The processing employed is of the type described in appendix II, for example.

Note that, in the context of the above processing, a vectorial estimate of the residual error and noise is used, the forward and backward filters being calculated block by block to minimize this vector.

This vectorial processing simplifies calculation.

The input of the decision means 11 receives data from the output of the subtractor 10 and from the output of the decoder 13.

The algorithm may be of a different type, in particular of the SIC/PIC type (serial and/or parallel cancellation of residual space interference at the output of the subtractor means of the equalizer—see appendix III).

Alternatively, the algorithm may be a sphere decoder algorithm.

An algorithm of this kind has a complexity in O ($M^3$) (where M is the number of transmit antennas that is independent of Q.

This enables the use of modulation with a large number of states with a view to increasing the bit rate.

The output of the decision means 11 is forwarded to a space-time de-interleaving process 14 implemented at the binary level between said decision means 11 and the decoder 13.

The output of the decoder 13 is a bit probability.

This probability is forwarded firstly to the input of the decision algorithm 11 and secondly, after space-time interleaving (15), for weighted data reconstitution processing 16.

The weighted data reconstituted in this way is forwarded to the input of the backward filter 12.

The output of the backward filter 12 constitutes weighted regenerated data.

Furthermore, the error corresponding to the residual interference and noise that is injected at the input of the subtractor 10 is colored both in the time domain and in the space domain.

Although the time correlation has little impact on the processing carried out by the equalizer, the space correlation has an essential role.

This is why, in one embodiment, space whitening is effected by means of Cholesky factorization.

This space whitening is advantageously effected at the output of the subtractor 10.

In one particular embodiment, it may be effected by the sphere decoding algorithm 11 itself.

It may equally be integrated into the forward and backward filters 9 and 12.

Finally, in one embodiment, from a certain given number of iterations, for example from the second iteration, the forward filter 9 is advantageously replaced by an adapted filter.

As the backward filter is deduced directly from the forward filter, convolution of the adapted filter with the channel minus the central coefficient therefore results in this case.

Figure 4:
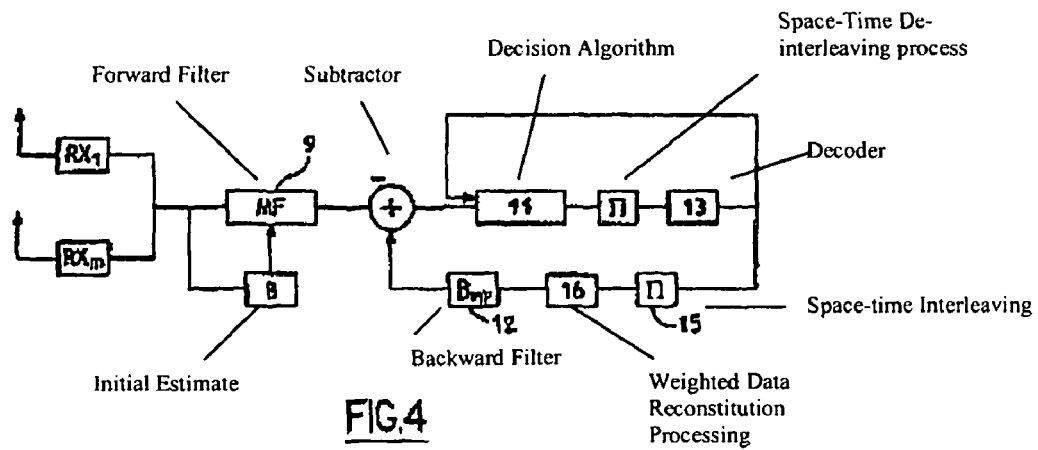
FIG. 4 shows the architecture of an iterative receiver that can be used from the second iteration, for example, or from subsequent iterations.

This is shown in FIG. 4, in which the forward filter 9 is an adapted filter MF while the backward filter 12 $B_{MF}$ is the adapted filter convoluted with the channel minus the central coefficient.

Appendix I

List of Abbreviations
APP: A Posteriori Probability
BCJR: Bahl, Cocke, Jelinek, Raviv (algorithm)
BLAST: Bell Labs Layered Space Time
CDMA: Code Division Multiple Access
IC: Interference Cancellation
ISI: Inter Symbol Interference
LDPC: Low Density Parity Check
MAI: Multiple Access Interference
MAP: Maximum A Posteriori
MF: Matched Filter
MIMO: Multiple Input Multiple Output
MMSE: Minimum Mean Square Error
OFDM: Orthogonal Frequency Division Multiplex
PIC: Parallel Interference Cancellation
SIC: Serial Interference Cancellation
SISO: Single Input Single Output
Soft-IC: Soft Interference Cancellation
STBC: Space-Time Block Codes
ST-BICM: Space-Time Bit-Interleaved Coded Modulation
STTC: Space-Time Trellis Codes
TDMA: Time Division Multiple Access
WMF: Whitening Matched Filter Appendix II Communications Model Consider a P-block channel with multiple inputs and outputs, T frequency-selective transmit antennas and R frequency-selective receive antennas of memory M.

A. Space-Time Binary Interleaving Coded Modulation

Let C denote a linear code of length $N_C$ and of yield $\rho_C$ on $F_2$ admitting a data vector $u \in F_2^{\rho_C N}$ and producing a coded word $c \in F_2^N$. It is assumed that the yield $\rho_C$ includes tail bits if conventional codes are employed. The coded word enters a well-designed binary interleaver $\Pi$, the output matrix $A \in F_2^{Tq*PL}$ whereof is segmented into P matrices $A^p \in F_2^{Tq*PL}$, p=1, ..., P. The columns of the matrix $A^p$ are vectors $a^p[n] \in F_2^{Tq}$, n=1, ..., L, called "symbol label vectors", containing T sub-vectors $a^p_t[n] \in F_2^q$, t=1, ..., T (one per input channel), with the stacked binary components $a^p_{<t,j>}[n], \ldots a^p_{<t,j>}[n]$, where $<t,j>$ represents the index $(t-1)q+j$. In each matrix $A^p$, all the vectors $a^p[n]$ are modulated by a memoryless D-dimensional modulator over a signal set $A \subset C^D$ of cardinality $|A|=2^{qT}$ via bit coding with symbol $\mu$: $\{0,1\}^{qT} \to A$. Without loss of generality, it is assumed that A is a simple product of T complex constellations C of the same order $2^q$ and that Gray coding is used for each constellation. After transformation of the signal, this coded modulation process may also be considered as a space-time coded modulation scheme in which all the code word complex symbols P×L×T are divided into P matrices $X_p \in C^{T \times L}$, p=1, ..., P, whereof the columns $x^p[n] \in C^T$, n=1, ..., L are called "constellation symbol vectors". The "symbol label vector" $a^p[n]$ may be obtained from $x^p[n]$ by simple inversion of bit coding with symbol $\mu^{-1}$. Falling into the general class of space-time codes, this architecture is called space-time bit-interleaved coded modulation (ST-BICM) [3]. From the Nyquist limited band ideal filtering assumption, the transmission yield (in bits per channel used) is:

$$\rho = qT\rho_c.$$

FIG. 1 shows a diagram of this communications model.

B. MIMO Channel

Let $H^p \in C^{R \times T \times (M+1)}$ be the MIMO channel for the block p, where p=1, ..., P and $H=\{H^p\}$ the set of all the channels. Also let $X^p \in C^{T \times L}$ and $Y^p \in C^{R \times L}$ respectively be the "constellation symbol matrix" and the "channel output matrix". The vectorial channel output in the equivalent baseband at discrete time $y^p[n] \in C^R$ at time n=1, ..., L may be written as follows:

$$y^p[n] = [H(z)]x^p[n] + w^p[n] = \sum_{k=0}^{M} H^p[k]x^p[n-k] + w^p[n] \quad (2)$$

In the above equation, $x^p[n] \in C^T$ are the "constellation symbol vectors" transmitted at the times $\underline{n}$, the energy of each component being equal to $\sigma_x^2$, $H^p[k] \in C^{R \times T}$ is the matrix of the number of taps $\underline{k}$ of the impulse response of the channel, $w^p[n] \in C^R$ is the additive complex noise vector. The additive complex noise vectors $w^p[n]$ are assumed to have a null, independent, identically distributed mean of complex Gaussian type with circular symmetry, and therefore follow the pdf $N(0, \sigma^2 I)$. The channel $H^p$, constant throughout the corresponding block, has a finite impulse response (FIR) of length M+1, the space symbol taps $H^p[0], \ldots, H^p[M]$ whereof are the random complex matrices R×T, of null mean, and the average power whereof satisfies the normalization constraints:

$$\mathbb{E}\left[\text{diag}\left\{\sum_{k=0}^{M} H^p[k]H^p[k]^\dagger\right\}\right] = TI \quad (3)$$

in the case of an equal power system. The operator "†" corresponds to the conjugate transposition operator. Equal channel memory for all the R×T possible links is a reasonable assumption given that the number of individual multichannel components is dictated predominantly by large structures and reflecting objects.

MIMO Interference Cancellation Iterative Block

A. Theory and Scheduling

The MIMO interference canceller iterative block processes each received data block $Y^p$, p=1, ..., P separately using random probabilistic information fed back by the output decoder. All the signals and elements described are therefore indexed block by block. This dependency is sometimes dispensed with to simplify the notation. During each iteration I, a linear forward filter $F^1$ applied to each received symbol of vector y[n] produces the vector signal $y^1[n]$. Then an appropriately constructed estimate $e^1[n]$ of the MAI and of the ISI degrading x[n] is subtracted from the vector signal $y^1[n]$ to produce $z^1[n]$:

$$z^1[n] = \tilde{y}^1[n] - e^1[n] \quad (8)$$

The estimate of the vector $e^1[n]$ comes from the output of the backward filter $B^1$ excited by the flexible decision attempt vector $x^1[n]$ on the vector x[n], given the prior knowledge available (extrinsic probability distribution) on the iteration 1-1.

The description now turns to the core of the MIMO turbo-equalizer, namely the derivation of the MIMO forward and backward finite impulse response filters.

B. Calculation of Forward and Backward Filters

The description begins with a few basic manipulations of the instantaneous output $y^1[n]$ of the forward filter $F^1$:

$$\tilde{y}^1[n] = \sum_{i=-L_{F_1}}^{L_{F_2}} F^l[i]y[n-i] \quad (22)$$

Since:

$$y[n] = \sum_{k=0}^{M} H[k]x[n-k] + w[n] \quad (23)$$

each sample $y^1[n]$ may be expanded as follows:

$$\tilde{y}^1[n] = \sum_{i=-L_{F_1}}^{L_{F_2}} \sum_{k=0}^{M} F^l[i]H[k]x[n-i-k] + \sum_{i=-L_{F_1}}^{L_{F_2}} F^l[i]w[n-i] \quad (24)$$

An equivalent matrix notation for the convolution of two filters $H_C$ and $F^1$ is:

$$\tilde{y}^1[n] = F^1 H_c x_c[n] + F^1 w_c[n] \quad (25)$$

in which:

$$F^1 = [F^1[-L_{F_1}] \ldots F^1[0] \ldots F^1[L_{F_2}]] \in C^{T \times RL_F} \quad (26)$$

is the forward filter of order $L_F=L_{F_1}+L_{F_2}+1$, where:

$$H_e = \begin{bmatrix} H[0] & H[1] & \cdots & H[M] & & & \\ & H[0] & H[1] & \cdots & H[M] & & \\ & & H[0] & H[1] & & H[M] & \\ & & & \ddots & & & \ddots \\ & & & & H[0] & H[1] & \cdots & H[M] \end{bmatrix} \in \quad (27)$$

$$\mathbb{C}^{RL_F \times T(L_F+M)}$$

is the Toeplitz diagonal-band channel matrix and:

$$x_c[n] = \begin{bmatrix} x[n+L_{F_1}] \\ \vdots \\ x[n] \\ \vdots \\ x[n-L_{F_2}-M] \end{bmatrix} \in \mathbb{C}^{T(L_F+M)} \quad (28)$$

is the vector transmitted.

Introducing the combined filter:

$$G^1 = F^1 H_c = [G^1[-L_{G_1}] \ldots G^1[0] \ldots G^1[L_{G_2}]] \epsilon C^{T \times TL_G} \quad (30)$$

the following final expression is obtained:

$$\tilde{y}^1[n] = G^1 x_c[n] + F^1 w_c[n] \quad (31)$$

where $L_{G_1}=L_{F_1}$, $L_{G_2}=L_{F_2}+M$ and $L_G=L_F+M$.

By analogy, the backward filter is defined as follows:

$$B^1 = [B^1[-L_{B_1}] \ldots 0 \ldots B^1[L_{B_2}]] \epsilon C^{T \times TL_B} \quad (32)$$

The output of the scrambling corrector may be written:

$$z^1[n] = \sum_k G^1[k]x[n-k] - \sum_k B^1[k]\bar{x}^1[n-k] + \quad (33)$$
$$\sum_k F^1[k]w[n-k]$$

The noise and residual scrambling vector $v^1[n]$ (also called the MIMO equalizer error vector) is expressed as follows:

$$v^1[n] = z^1[n] - G^1[0]x[n] \quad (34)$$
$$= \sum_{k \neq 0} G^1[k]x[n-k] - \sum_k B^1[k]\bar{x}^1[n-k] +$$
$$\sum_k F^1[k]w[n-k]$$
$$= \sum_k \underline{G}^1[k]x[n-k] - \sum_k B^1[k]\bar{x}^1[n-k] +$$
$$\sum_k F^1[k]w[n-k]$$

in which:

$$\underline{G}^1 = [G^1[-L_{G_1}] \ldots 0 \ldots G^1[L_{G_2}]] \quad (35)$$

The filters $F^1$ and $B^1$ are calculated block by block to minimize the mean square error of the MIMO equalizer,
under the constraint $G^1[0]=I$, a problem that may be formulated compactly as follows in the MIMO situation:

$$\{F^1, B^1\} = \arg \min_{\{F,B\}/G^1[0]=I} tr\mathbb{E}\{v^1[n]v^1[n-k]^\dagger\}$$
$$= \arg \min_{\{F,B\}/G^1[0]=I} tr\{K_v^1\}$$

The MSE minimization is executed in two successive steps and finally yields:

$$B^1 = \underline{G}^1 \quad (37)$$

$$F^1 = (E_\Delta H_c^\dagger \Phi^{1^{-1}} H_c E_\Delta^\dagger)^{-1} E_\Delta H_c^\dagger \Phi^{1^{-1}} \quad (38)$$

where:

$$E_\Delta = [\underbrace{\cdots 0 \cdots}_{L_{G_1}} \; I \; \underbrace{\cdots 0 \cdots}_{L_{G_2}}] \in \mathbb{C}^{T \times TL_G} \quad (39)$$

and where:

$$\Phi^1 = [(\sigma_x^2 - \sigma_{\bar{x}}^{1^2})H_c H_c^\dagger + \sigma^2 I] \quad (40)$$

with:

$$\sigma_{\bar{x}}^{1^2} \simeq \frac{1}{LT} \sum_{n=1}^L \bar{x}^1[n]^\dagger \bar{x}^1[n] \quad (41)$$

It should be emphasized that the noise plus residual scrambling at the output of the subtractor is correlated in space and in time. The time correlation has no real impact on subsequent processing but the space correlation has a key role in this respect. Space white noise may easily be obtained by simple Cholesky factorization of the correlation matrix $K^1_v$.

Proposition 2: Since the correlation matrix $K^1_v$ is defined as positive, Cholesky factorization is always applicable. Knowing this:

$$K_v^1 = LL^\dagger \quad (42)$$

where L is a lower triangular matrix. Then, by applying $F^{1\prime}=L^{-1}F^1$ and $B^{1\prime}=L^{-1}B^1$ as forward filter and backward filter (instead of $F^1$ and $B^1$), the scrambling plus noise correlation matrix equals the identity matrix.

Proof: The proof is self-evident.

$$K_v^{v'} = [(\sigma_x^2 - \sigma_{\bar{x}}^{1^2})L^{-1}B^1B^{1\dagger}(L^{-1})^\dagger + \sigma^2 L^{-1}F^1F^{1\dagger}(L^{-1})^\dagger] \quad (43)$$
$$= L^{-1}[(\sigma_x^2 - \sigma_{\bar{x}}^{1^2})B^1B^{1\dagger} + \sigma^2 F^1F^{1\dagger}](L^{-1})^\dagger$$
$$= L^{-1}K_v^1(L^{-1})^\dagger$$
$$= I$$

Validates the algorithm proposed by the FIG. 3 simulation.

Below, the output of the equalizer is always considered with space whitening so that:

$$z^1[n] = G^1[0]x[n] + v^1[n]$$

where $K_v^1 = I$ and $G^1[0] = L^{-1}$.

It is interesting to note that the MMSE criterion corresponds to maximizing the SNR $tr\{G^1[0]^+K_v^1 G^1[0]\}$. The maximum SNR given for the adapted filter is achieved for $\sigma_x^2 = \sigma_x^2$.

C. Exhaustive APP Decoder

All the probabilistic quantities exchanged during the iterations are defined below. The object of the detection portion of the MIMO equalizer is to supply extrinsic information on the bits of the symbols of the matrix A in accordance with the new communications model (10) where $G^1[0]$ plays the role of a flat MIMO channel equivalent T×T and $v^1[n]$ is the residual interference plus whitened noise. The logarithmic ratios APP over all the bits of the symbols $a_{<t,j>}[n]$ are defined as follows:

$$\lambda_{(t,j)}^{l,d}[n] = \ln\frac{Pr[a_{(t,j)}[n] = 1 | z^l[n]]}{Pr[a_{(t,j)}[n] = 0 | z^l[n]]} \quad (11)$$

By simple marginalization, the following is obtained:

$$\lambda_{(t,j)}^{l,d}[n] = \ln\frac{\sum_{a \in \Omega_{(t,j)}^{(1)}} Pr^d[x[n] = \mu(a) | z^l[n]]}{\sum_{a \in \Omega_{(t,j)}^{(0)}} Pr^d[x[n] = \mu(a) | z^l[n]]} \quad (12)$$

where: $\quad (13)$
$\Omega_{(t,j)}^{(\varepsilon)} = \{a \in F_2^{qT}, a_{(t,j)} = \varepsilon\}$ The logarithmic ratios APP may be expanded as follows:

$$\lambda_{(t,j)}^{l,d}[n] = \ln\frac{\sum_{a \in \Omega_{(t,j)}^{(1)}} p(z^l[n] | x = \mu(a)) Pr^d[a[n] = a]}{\sum_{a \in \Omega_{(t,j)}^{(0)}} p(z^l[n] | x = \mu(a)) Pr^d[a[n] = a]} \quad (14)$$

Assuming that perfect space-time interleaving authorizes broadcasting the probabilities previously joined in the product of their marginal digit component:

$$\lambda_{(t,j)}^{l,d}[n] = \ln\frac{\sum_{a \in \Omega_{(t,j)}^{(1)}} p(z^l[n] | x = \mu(a))\prod_{\{t,j\}} Pr^d[a_{(t,j)}[n] = a_{(t,j)}]}{\sum_{a \in \Omega_{(t,j)}^{(0)}} p(z^l[n] | x = \mu(a))\prod_{\{t,j\}} Pr^d[a_{(t,j)}[n] = a_{(t,j)}]} \quad (15)$$

Assuming that $v^1[n]$ has been spatially whitened by any means (for example by Cholesky factorization), the Euclidean metric may be used in the evaluation of the probability:

$$p(z^l[n] | x) \propto \exp\left\{-\frac{1}{2\sigma^2}\|z^l[n] - G^l[0]x\|^2\right\} \quad (16)$$

In the general case, the correlation matrix $K_v^1$ of the noise vector must be taken into account in evaluating the probability:

$$p(z^1[n]|x) \propto \exp\{-(z^1[n]-G^1[0]x)^\dagger K_v^{1-1}(z^1[n]-G^1[0]x)\} \quad (17)$$

As has been established in the field of turbodetectors, the extrinsic logarithmic probability rates are deduced from the equation:

$$\xi_{(t,j)}^{l,d}[n] = \ln\frac{\sum_{a \in \Omega_{(t,j)}^{(1)}} p(z^l[n] | x = \mu(a))\prod_{\{t',j'\} \neq \{t,j\}} Pr^d[a_{(t',j')}[n] = a_{(t',j')}]}{\sum_{a \in \Omega_{(t,j)}^{(0)}} p(z^l[n] | x = \mu(a))\prod_{\{t',j'\} \neq \{t,j\}} Pr^d[a_{(t',j')}[n] = a_{(t',j')}]} \quad (18)$$

All the logarithmic extrinsic information samples from the MIMO detector are collected from all the blocks $p=1, \ldots, P$ and rearranged, after space-time de-interleaving $\Pi^{-1}$, into a simple observation vector $\zeta^{1,c} \in R^N$, on the basis whereof the output decoder supplies the logarithmic extrinsic probability ratios over all the code word bits:

$$\xi^{l,c}[n] = \ln\frac{Pr[c[n] = 1 | \mathscr{E}, \zeta^{l,c}/\{\zeta^{l,e}[n]\}]}{Pr[c[n] = 0 | \mathscr{E}, \zeta^{l,c}/\{\zeta^{l,e}[n]\}]} \quad (19)$$

After the space-temporal de-interleaving $\Pi$, the vector $\xi^{1,c}$ is broadcast into P matrices $\Pi^{1,p}$ of preceding logarithmic probability rate, one for each block of data $A^p$. For each block $p=1, \ldots, P$, the input to $\Pi^{1,p}$ is given by the equation:

$$\pi_{(t,j)}^l[n] = \ln\frac{Pr^d[a_{(t,j)}[n] = 1]}{Pr^d[a_{(t,j)}[n] = 0]} \quad (20)$$

This means that the soft decision vector $x^1[n]$ can be rewritten as follows:

$$\bar{x}^1[n] = \frac{1}{2}\sum_{x \in C^T} x \prod_{\{t,j\}}\left\{1 + (2\mu_{(t,j)}^{-1}(x) - 1)\tanh\left(\frac{\pi_{(t,j)}^1[n]}{2}\right)\right\} \quad (21)$$

D. Quasi-Optimum MIMO Detection Via the Sphere Decoded Modified List

Optimum MIMO detection cannot be retained in the event of high bit rate communications scenarios because point enumeration of the entire subsets of constellation $\Omega^{<0>}_{<t,j>}$ and $\Omega^{<1>}_{<t,j>}$, the cardinality whereof varies in $O(2^{qT})$, may rapidly become overpowering for higher order modulation and/or a large number of transmit antennas. Careful analysis of the probability values indicates that a large number of them are negligible. Consequently, as a significant contribution of this paper, we suggest replacing in-depth point enumeration by point enumeration of much smaller subsets $L^{<0>}_{<t,j>}$ and $L^{<1>}_{<t,j>}$, are also called lists, which contain only non-negligible probabilities. The logarithmic extrinsic probability ratios then become:

$$\xi_{(t,j)}^{l,d}[n] = \ln \frac{\sum_{a \in \Omega_{(t,j)}^{(1)}} p(z^i[n] \mid x = \mu(a)) \prod_{\{t',j'\} \neq \{t,j\}} Pr^i[a_{(t',j')}[n] = a_{(t',j')}]}{\sum_{a \in \Omega_{(t,j)}^{(0)}} p(z^i[n] \mid x = \mu(a)) \prod_{\{t',j'\} \neq \{t,j\}} Pr^i[a_{(t',j')}[n] = a_{(t',j')}]}$$ (18)

In geometrical terms, they contain points of the trellis in a sphere of radius r centered on a carefully selected point (for example the point ML with no constraint or the point ML itself). Modified versions of the sphere decoder have been employed with some success to show these lists [2]. The sphere radius r chosen governs the quality and complexity of the corresponding MIMO detector.

E. PIC Detection Algorithm

The sphere decoder may be considered too complex. One way to reduce further the complexity of the detector is to generate the APP log independently for each dimension. On iteration I, the decision variable for the component x is:

$$r_t^I[n] = (g_t^\dagger g_t)^{-1} g_t^\dagger \left( z^I[n] - \sum_{k \neq t} g_k \bar{x}_k \right)$$

where $g_k$ is the column k of the matrix Gl[0]. The ratios APP log $\xi^1_{<t,j>}[n]$, j=1, ..., q are then calculated assuming that $r^1_t[n]$ is a Gaussian variable with mean $x_t$ and estimated variance:

$$\hat{\sigma}_{t,I}^2 = \frac{1}{L} \sum_{n=1}^{L} |r_t^I[n]|^2 - \sigma_x^2$$

The first iteration detector may be improved using a SIC technique in the following manner:

Initialization

Classify the components in decreasing order as a function of their signal to interference ratio (SIR), for example:

$$SIR(x_1) > SIR(x_2) > \ldots > SIR(x_T) \text{ with:}$$

$$SIR(x_i) = \frac{g_i^\dagger g_i}{\sum_{k \neq i} g_k^\dagger g_k + \sigma^2}$$

Recursivity

For t=1 to T

Calculate:

$$r_t^1[n] = (g_t^\dagger g_t)^{-1} g_t^\dagger (z^1[n] - \Sigma_{k<t} g_k \tilde{x}_k[n])$$

Calculate the ratio APP log $\xi^1_{<t,j>}[n]$, j=1, ..., q assuming that $r^1_t[n]$ is a Gaussian variable with mean $x_t$ and estimated variance:

$$\hat{\sigma}_{t,I}^2 = \frac{1}{L} \sum_{n=1}^{L} |r_t^I[n]|^2 - \sigma_x^2$$

Calculate the MMSE estimate of $x^t$ knowing $r^1_t[n]$:

$$\tilde{x}_t[n] = E\{x_t[n] \mid r_t^1[n]\}$$

Appendix III

BIBLIOGRAPHY

[1] S. Ariyavisitakul, "Turbo Space-Time Processing to Improve Wireless Channel Capacity," IEEE Trans. Commun., vol. COM-48, no. 8, pp. 1347-1358, August 2000.

[2] B. M. Hochwald, S. Ten Brink, "Achieving Near-Capacity on a Multiple-Antenna Channel," IEEE Trans. Commun., vol. 51, no. 3, pp. 389-399, March 2003.

[3] R. Visoz, A. O. Berthet, "Iterative Decoding and Channel Estimation for Space-Time BICM over MIMO Block Fading Multipath AWGN Channel," IEEE Trans. Commun., vol. COM-51, no. 8, pp. 1358-1367, August 2003.

[4] X. Wang, H. V. Poor, "Iterative (Turbo) Soft-Interference Cancellation and Decoding for Coded CDMA," IEEE Trans. Commun., vol. COM-47, no. 7, pp. 1046-1061, July 1999.

The invention claimed is:

1. An iterative decoding and equalizing device for high bit rate communication over frequency-selective channels with multiple transmit and receive antennas, said device comprising:
a decision feedback equalizer adapted to receive data from different receive antennas and including:
a forward filter,
a recursive backward filter fed with an output of a weighted data reconstitution processing unit,
the weighted data reconstitution processing unit fed with an output of a channel decoder; and
a subtractor for subtracting an output of the recursive backward filter from an output of the forward filter to output subtracted data,
wherein the subtracted data is fed to decision means along with the output of the channel decoder,
wherein the decision means produce a statistic which is forwarded to the channel decoder,
wherein the decision means take into account space noise correlation at the subtracted data of the subtractor,
wherein the decision means and the channel decoder are separated by space-time de-interleaving at a binary level, and
wherein the forward filter and the recursive backward filter are iteratively adapted minimizing a mean square error at the output of the subtraction means.

2. The device according to claim 1, wherein the decision means is a space whitening type and include a sphere decoder.

3. The device according to claim 1, wherein the decision means is Serial Interference Cancellation (SIC) or Parallel Interference Cancellation PIC type adapted to cancel residual space interference at the subtracted data of the subtractor.

4. The device according to claim 1, wherein, starting from a certain iteration, the forward filter is an adapted filter.

5. A system for high bit rate communication over frequency-selective channels with multiple transmit and receive antennas, comprising:

a receiver that includes the iterative decoding and equalizing device according to claim 1.

6. An iterative equalization and decoding method for high bit rate communication over frequency-selective channels with multiple transmit and receive antennas, comprising:
- a step of decision feedback equalizing of data received from the receive antennas, wherein the step of decision feedback equalizing comprises:
  - a step of filtering the data received from the receive antennas by a forward filter,
  - a step of filtering a weighted reconstitution data from a weighted data reconstitution processing unit by a recursive backward filter,
  - a step of calculating the weighted reconstitution data from an output of a channel decoder by the weighted data reconstitution processing unit;
- a step of subtracting an output of recursive backward filter from an output of the forward filter to output an subtracted data; and
- a step of detecting applied to the subtracted data obtained following the subtracting step and to the output of the channel decoder, wherein the detecting step taking into account spatial noise correlation of an error of the decision feedback equalizing step obtained as output from the subtracting step and generating a statistic which is forwarded to the channel decoder after a step of space-temporal de-interleaving at a binary level, wherein the forward and recursive backward filters are configured in an iterative manner to minimize a mean square error obtained following the subtracting step.

7. The method according to claim 6, further comprising:
- a step of whitening the error of the decision feedback equalizer obtained as output from the subtracting step.

8. The method according to claim 6, wherein the detecting step implements a sphere decoding algorithm.

9. The method according to claim 6, wherein the step of filtering the data received from the receive antennas by the forward filter, starting from a certain iteration, the forward filter is an adapted filter.

* * * * *